United States Patent

Allen et al.

[11] 4,121,377
[45] Oct. 24, 1978

[54] GREENHOUSE DISPLAY BENCH

[76] Inventors: Peter A. Allen; Robert S. Richfield, both of 108 Blossom Rd., Westport, Mass. 02790

[21] Appl. No.: 777,569

[22] Filed: Mar. 14, 1977

[51] Int. Cl.² .............................................. A01G 9/00
[52] U.S. Cl. ............................................ 47/18; 108/59; 182/194; 182/222; 182/228
[58] Field of Search ........................ 47/18, 39, 82, 83; 182/20, 21, 28, 32, 33, 33.3, 33.4, 53, 54, 55, 56, 82, 222, 223, 228, 194; 108/25, 26, 53.5, 59, 60, 61, 92, 100, 109, 110, 17, 64; 52/127, 413, 415, 582, 613

[56] References Cited

U.S. PATENT DOCUMENTS

| 247,676 | 9/1881 | Miller | 47/39 X |
|---|---|---|---|
| 319,339 | 6/1885 | Stephenson | 108/17 |
| 379,261 | 3/1888 | Wright | 108/26 |
| 1,408,226 | 2/1922 | Sheldon | 52/127 X |
| 1,594,754 | 8/1926 | Reines | 108/61 |
| 3,024,569 | 3/1962 | Nearing et al. | 47/18 |
| 3,314,206 | 4/1967 | Dau | 52/624 X |
| 3,365,840 | 1/1968 | Cooper | 47/82 |
| 3,389,666 | 6/1968 | Schultze-Bonatz | 108/17 |
| 3,513,786 | 5/1970 | Kellogg | 108/64 |
| 4,024,929 | 5/1977 | Mintz | 182/228 |

FOREIGN PATENT DOCUMENTS

| 13,269 | 4/1881 | Fed. Rep. of Germany | 47/39 |
|---|---|---|---|
| 1,173,326 | 2/1959 | France | 182/222 |
| 1,244,722 | 9/1971 | United Kingdom | 182/222 |

Primary Examiner—Edgar S. Burr
Assistant Examiner—James R. Feyrer
Attorney, Agent, or Firm—Clarence A. O'Brien; Harvey B. Jacobson

[57] ABSTRACT

Greenhouse plants are displayed on horizontal shelves supported between side rails extending at an angle between vertical support posts, the posts being interconnected in pairs between confronting vertical grooves formed in the posts. Each shelf is assembled from elongated sections held in parallel spaced relation to each other by spacers at the longitudinal ends of the shelf which are received within grooves formed in the side rails.

12 Claims, 9 Drawing Figures

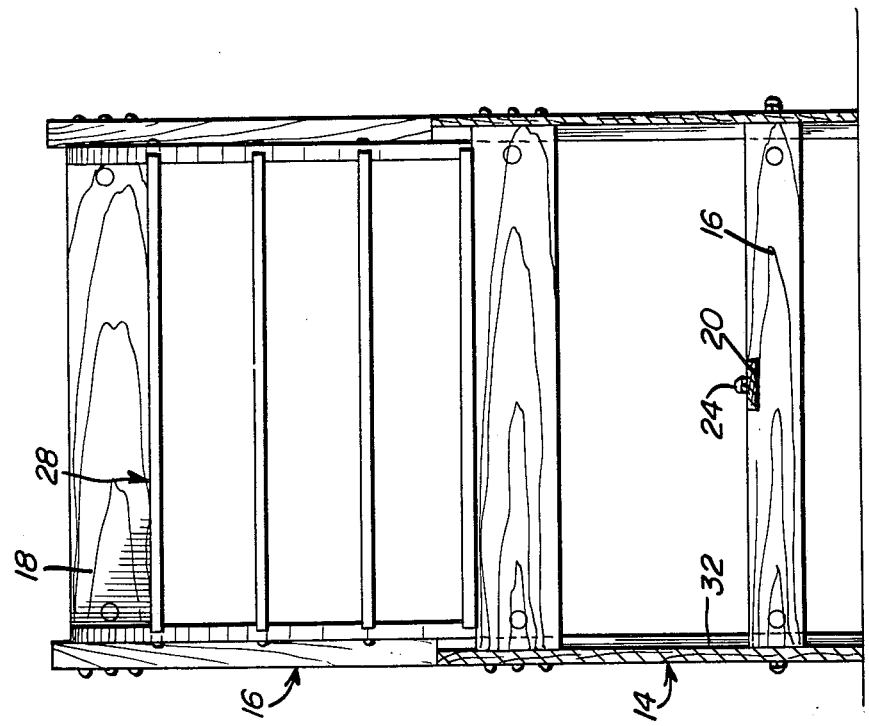
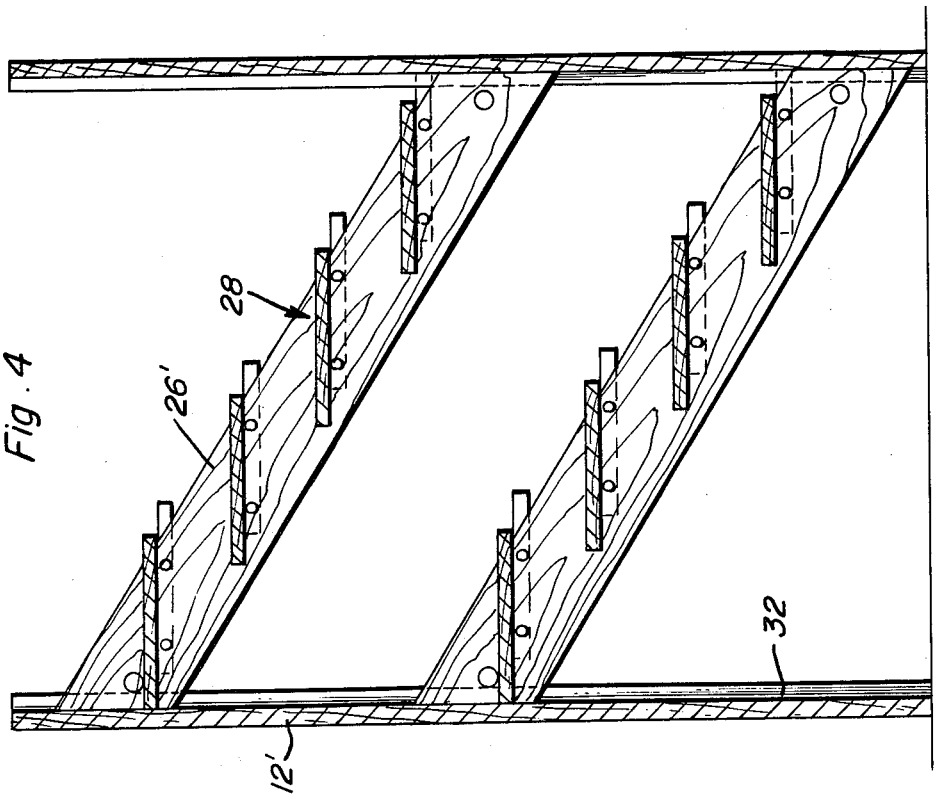

GREENHOUSE DISPLAY BENCH

BACKGROUND OF THE INVENTION

This invention relates to the construction of greenhouse benches for display of plants.

Greenhouse benches are, of course, well known. Basic structural arrangements for such benches are disclosed, for example, in U.S. Pat. Nos. 247,676, 319,339 and 3,024,569. Construction of horizontal supporting shelves in general, utilizing interconnected wood sections are shown by way of example in U.S. Pat. Nos. 1,408,226, 3,314,206 and 3,513,786. The prior art as exemplified by the foregoing patents suggest the construction of greenhouse display benches which require special hardware and fabrication methods of virtue of which bench assemblies are rather expensive, and very limited as to installation. It is therefore an important objective of the present invention to provide a greenhouse display bench construction that is relatively inexpensive and more flexible with respect to meeting different installational requirements.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse section view taken substantially through a plane indicated by section line 3—3 in FIG. 1.

FIG. 4 is a transverse section view taken substantially through a plane indicated by section line 4—4 in FIG. 2.

FIG. 5 is an enlarged partial section view taken substantially through a plane indicated by section line 5—in FIG. 1, with parts broken away and shown in section.

FIG. 6 is an enlarged partial section view taken substantially through the plane indicated by section line 6—6 in FIG. 5.

FIG. 9 is a partial perspective view showing certain disassembled parts of the bench illustrated in FIG. 1.

DESCRIPTION OF THE PREFERRED EMBODIMENT

Figure 1:
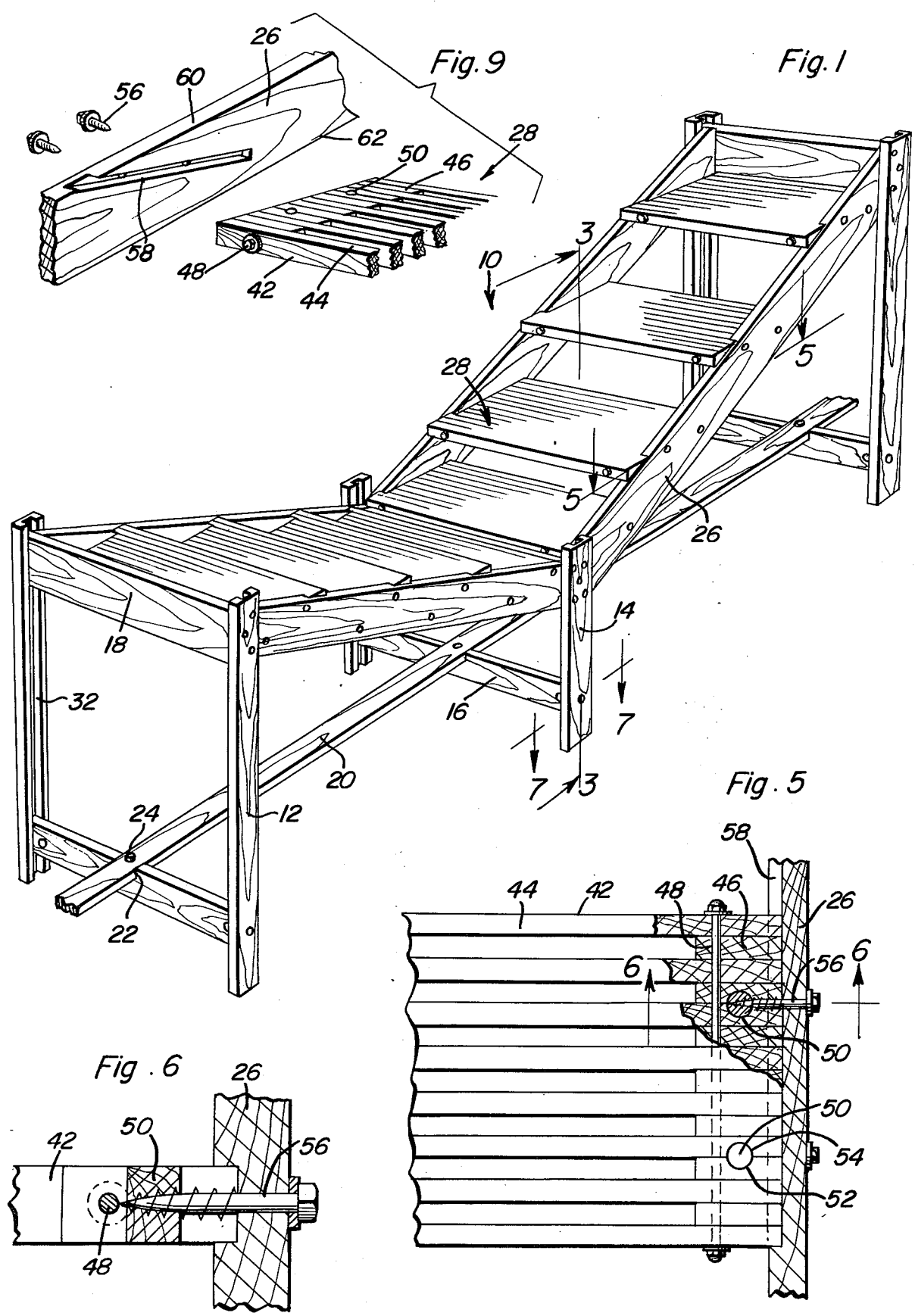
FIG. 1 is a perspective view illustrating a greenhouse display bench constructed in accordance with one embodiment of the invention.

Referring now to the drawings in detail, FIG. 1 illustrates a section of a greenhouse display bench, generally referred to by reference numeral 10, constructed in accordance with one embodiment of the present invention. This form of display bench is preferably located against the exterior walls of the greenhouse allowing maximum light transmission, increased storage area and an unobstructed view of the plant specimens displayed thereon as well as to provide a unique aesthetic appearance. A plurality of such bench sections may be assembled to meet different dimensional and/or spatial requirements.

Each display bench section 10 includes two outer pairs of vertical posts 12 and a pair of shorter intermediate posts 14. Each pair of posts are interconnected adjacent their lower ends by a stretcher bar 16. Cross bars 18 interconnect each pair of posts adjacent their upper ends. The assembled pairs of posts are interconnected in spaced relationship to each other by a lower connecting bar 20, which may extend beyond any section so as to interconnect a plurality of such sections in order to stabilize a complete assembly. The interconnecting bar 20 is received within notches 22 formed in each stretcher bar 16 and is secured thereto by a fastener 24. Parallel-spaced side rails 26 are interconnected between the intermediate posts 14 and the outer posts 12 of each bench section, the side rails diverging at upward angles from the intermediate posts toward the outer posts to which the side rails are connected, adjacent the upper ends of the posts. A plurality of horizontal shelf assemblies generally referred to by reference numeral 28 are supported in vertically spaced, overlapping relationship to each other between the side rails 26. The plant specimens are positioned on these shelf assemblies. Each of the posts, interconnecting bar 20, stretcher bars 16, cross bars 18, side rails 26 and shelf assemblies 28 are preferably made of a weather-resistant material such as redwood boards, while the fastener assemblies interconnecting the latter components are preferably made of galvanized steel.

Figure 2:
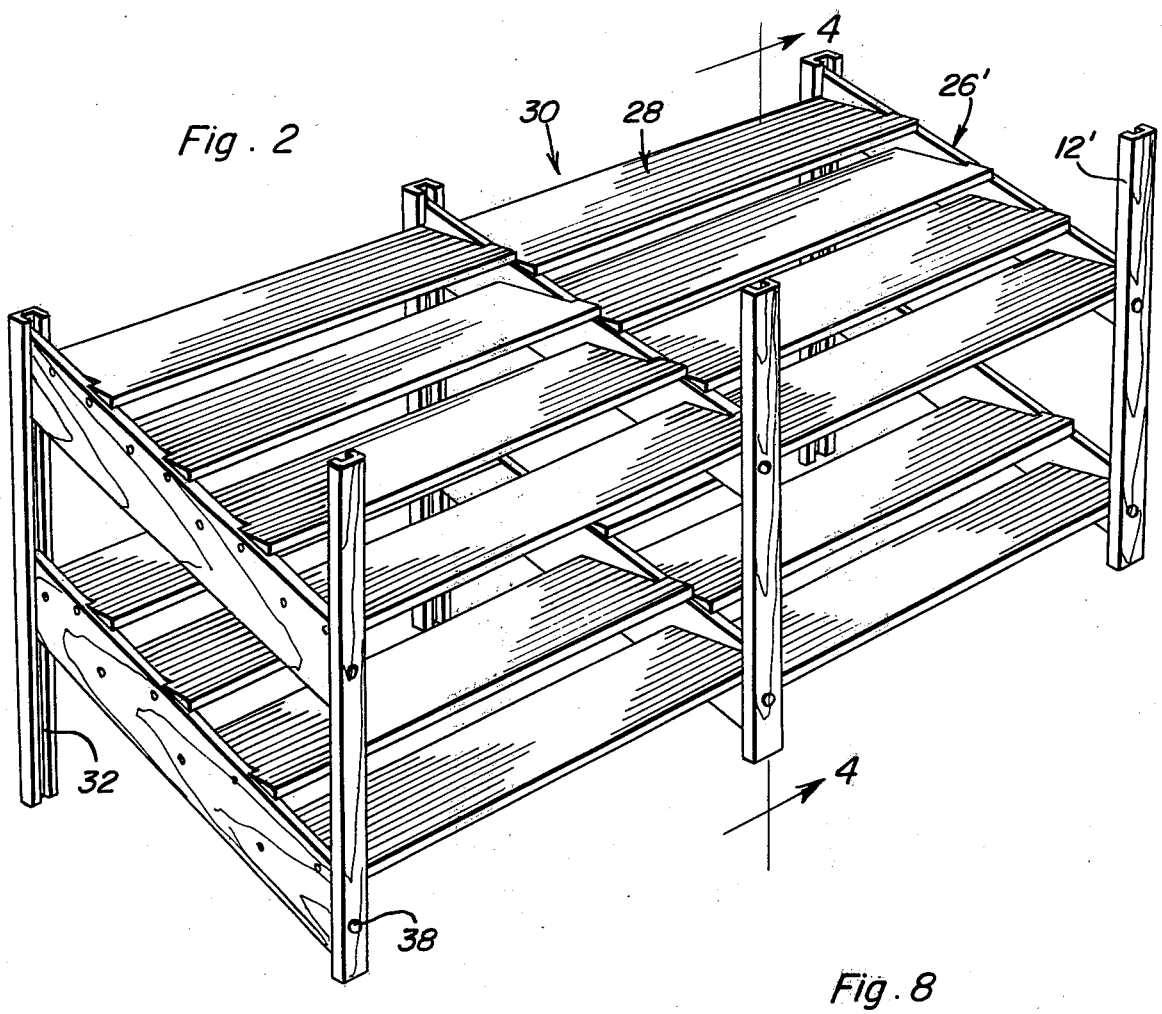
FIG. 2 is a perspective view illustrating a display bench constructed in accordance with another embodiment of the invention.

FIG. 2 illustrates another display bench arrangement generally referred to by reference numeral 30 in accordance with another embodiment of the present invention made of similar materials. The display bench assembly 30 supports a plurality of horizontal shelf assemblies 28 which may be the same as those associated with the bench section 10 hereinbefore described. The shelf assemblies 28 associated with the bench 30 are also supported in vertically spaced, overlapping relationship to each other between side rails 26'. The side rails are interconnected between pairs of vertical posts 12' similar to the long posts 12 hereinbefore described with respect to FIG. 1. The side rails also extend at an angle to the vertical posts, at least two of such side rails being interconnected in vertically spaced relationship to each other between each pair of posts. The shelf assemblies 28 extending in opposite directions from the common side rails interconnecting the intermediate pair of posts 12', are out of alignment with each other as shown in FIGS. 2 and 4, so that the fasteners which interconnect each shelf assembly with the common side rail will not interfere with each other.

Figure 7:
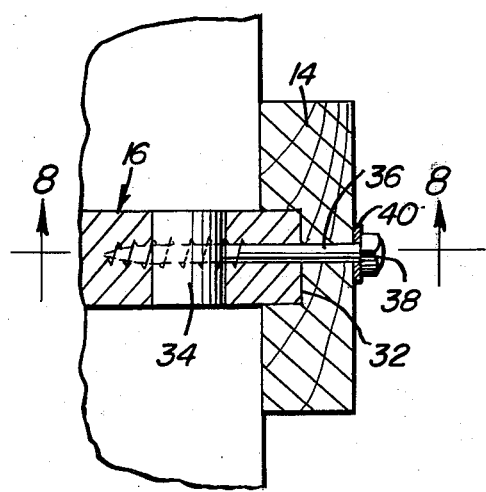
FIG. 7 is an enlarged partial section view taken substantially through a plane indicated by section line 7—7 in FIG. 1.
Figure 8:
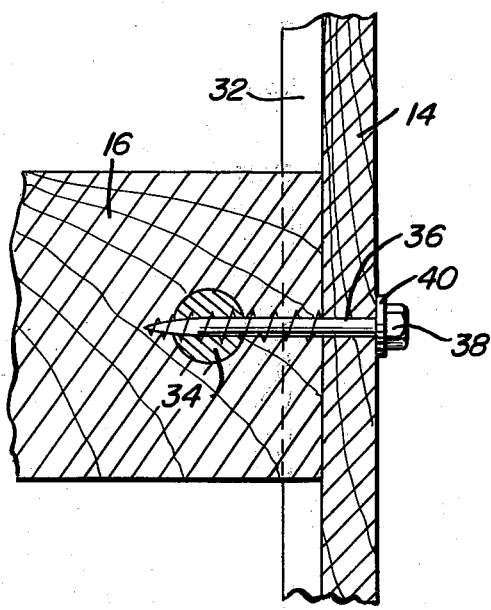
FIG 8 is a section view taken substantially through the plane indicated by section line 8—8 in FIG. 7.

As hereinbefore indicated, each of the vertical posts are similar to each other except for vertical dimension. The confronting sides of each pair of posts are provided with vertical grooves 32 so that they may be interconnected either by the stretcher bars 16 as shown in FIGS. 1 and 3, or by the side rails 26' themselves, as shown in FIGS. 2 and 4. As more clearly seen in FIGS. 7 and 8, each stretcher bar 16 is provided with a cylindrical hardwood plug 34 located adjacent the longitudinal end of the stretcher bar which is received within the vertical groove 32 of the post to which it is connected. A threaded fastener bolt 36 extends from the post through the groove 32 into the stretcher bar 16 and through the plug 34 in order to provide a firm and reliable connection. The grain of the wood plug 34 is favorably aligned as compared to the grain of the stretcher bar 16 in order to more reliably receive and grip the threads of the bolt 36. The head 38 of the bolt bears against a washer 40, which in turn bears against the outside surface of the post.

Referring now to FIGS. 5, 6 and 9, the construction of each shelf assembly 28 and its connection to a side rail, will become more apparent. Each shelf assembly 28 is assembled from a plurality of elongated wooden sections 42, the upper edges 44 of which are aligned with each other to form a supporting surface. The sections 42 are maintained in parallel-spaced relationship to each other by spacer sections 46 positioned at the end portions of the shelf assembly as well as at an intermediate location between the end portions. A clamp bolt 48 extends through the sections 42 and abutting spacers 46 in order to hold them assembled. At least two cylindrical plugs 50 are held assembled between confronting recesses 52 and 54 formed in an abutting section 42 and spacer 46. The plugs 50 are adapted to threadedly receive screw fasteners 56 which extend from the side rails 26 to which the shelf assembly is connected. The end portion of each shelf assembly is therefore received within a groove 58 formed on the inside surface of the side rail 26, as more clearly seen in FIG. 9. The groove 58 extends from the upper longitudinal edge 60 of the side rail at an angle thereto so as to position the shelf assembly in a substantially horizontal orientation. The groove 58 terminates in spaced relationship to the lower longitudinal edge 62 of the side rail. The relative width of the shelf assembly is dimensioned so that the shelf assembly projects beyond the upper edge 60 of the side rail in order to overlie the shelf assembly located therebelow. The threaded fasteners 56 extend from the side rail through the groove 58 between a section 42 and an abutting spacer 46 into a plug 50, as aforementioned. The grain of the plugs 50 are favorably aligned in order to anchor the fastener 56 and establish a firm and reliable connection between the side rail and the shelf assembly interconnected therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a greenhouse display bench having a plurality of vertical posts, side rails interconnected between said posts at an angle thereto and a plurality of horizontal shelves supported by said side rails, each of said side shelves comprising a plurality of elongated sections having opposite longitudinal end portions, spacer means disposed in abutment between said sections at the end portions for maintaining the sections assembled in parallel spaced relation to each other, clamp means extending through said sections and the spacer means for holding the sections assembled, at least one of said sections and an abutting one of the spacer means having confronting recesses formed therein, a plug disposed within said recesses extending between said abutting section and spacer means and fastener means extending from one of the side rails between said abutting section and spacer means into the plug for interconnecting the shelf with the side rail.

2. The combination of claim 1 including means for interconnecting said posts in pairs, each of said pairs of posts having confronting vertical grooves.

3. The combination of claim 2 wherein said interconnecting means includes a stretcher bar received in said confronting grooves of each pair of posts, plugs inserted into the stretcher bar adjacent the posts and fasteners extending from the posts through the vertical grooves into the last mentioned plugs.

4. The combination of claim 2 wherein said interconnecting means includes the side rails received in said confronting vertical grooves.

5. The combination of claim 1 wherein each of said side rails has opposite ends connected to the posts and parallel spaced edges extending therebetween at said angle to the posts, spaced horizontal grooves being formed in the side rails and extending from an upper one of said edges terminating in spaced relation to the lower one of said edges, each of said grooves receiving the end portions of one of the shelves.

6. The combination of claim 5 wherein said fastener means extend through the grooves in the side rails.

7. The combination of claim 5 wherein the shelves project beyond the upper edges of the side rails.

8. The combination of claim 7 wherein said fastener means extend through the grooves in the side rails.

9. The combination of claim 8 including means for interconnecting said posts in pairs, each of said pairs of posts having confronting vertical grooves.

10. The combination of claim 9 wherein said interconnecting means includes the side rails received in said confronting vertical grooves.

11. The combination of claim 9 wherein said interconnecting means includes a stretcher bar received in said confronting grooves of each pair of posts, plugs inserted into the stretcher bar adjacent the posts and fasteners extending from the posts through the vertical grooves into the last mentioned plugs.

12. In a greenhouse display bench having a plurality of vertical posts, side rails interconnected between said posts at an angle thereto and a plurality of horizontal shelves having opposite end portions supported by said side rails, each of said side rails having opposite ends connected to the posts and parallel spaced edges extending therebetween at said angle to the posts, spaced horizontal grooves being formed in the side rails and extending from an upper one of said edges terminating in spaced relation to the lower one of said edges, each of said grooves receiving the end portions of one of the shelves, each of the shelves projecting beyond the upper edges of the side rails, and means for interconnecting said posts in pairs, each of said pairs of posts having confronting vertical grooves, said interconnecting means including a stretcher bar received in said confronting grooves of each pair of posts, plugs inserted into the stretcher bar adjacent the posts and fasteners extending from the posts through the vertical grooves into the plugs.

* * * * *